United States Patent [19]

Yoshizumi

[11] Patent Number: 4,524,637
[45] Date of Patent: Jun. 25, 1985

[54] SPRING-OPERATED MECHANISM

[75] Inventor: Toshiaki Yoshizumi, Minoo, Japan

[73] Assignee: Mitsubishi Denki Kabushiki Kaisha, Tokyo, Japan

[21] Appl. No.: 400,715

[22] Filed: Jul. 22, 1982

[51] Int. Cl.³ .................. F16H 53/06; F16H 25/18
[52] U.S. Cl. .................. 74/569; 74/100 R; 200/67 A; 200/153 SC
[58] Field of Search .......... 74/569, 104, 105, 107, 74/100, 97; 200/67 A, 153 SC

[56] References Cited

U.S. PATENT DOCUMENTS

| | | | |
|---|---|---|---|
| 1,838,020 | 12/1931 | Hammerly | 200/67 A |
| 1,905,812 | 4/1933 | Dante | 200/67 A |
| 2,843,707 | 7/1958 | Berezansky et al. | 200/67 A |
| 2,910,557 | 8/1959 | Salzer et al. | 200/74 |
| 3,127,900 | 4/1964 | Kastner | 74/569 |
| 3,484,570 | 12/1969 | Perkins et al. | 74/97 |
| 3,577,887 | 5/1971 | Lambert | 200/153 SC |
| 3,696,684 | 10/1972 | Estlick | 74/104 |
| 3,737,142 | 6/1973 | Boswell et al. | 74/107 |
| 3,768,321 | 10/1973 | Cox | 74/97 |
| 4,019,008 | 4/1977 | Kohler et al. | 200/67 A |

FOREIGN PATENT DOCUMENTS 55-46609 4/1976 Japan.
159511 12/1980 Japan.
157417 9/1982 Japan.

*Primary Examiner*—Kenneth J. Dorner
*Attorney, Agent, or Firm*—Wenderoth, Lind & Ponack

[57] ABSTRACT

A spring-operated mechanism for actuating a switch gear, etc. comprises a cam member secured to a crankshaft and adapted to be moved thereby. Cam grooves are formed in the cam member such that the distance from the center of the crankshaft is smallest at the middle portion of the groove and progressively increases towards the extremities of the groove. A rod is provided with a pin at one end adapted to be rolled at each end within the cam grooves, and at the other end the rod is provided with a spring support. A stationary member is provided with guide elements to cause the rod to move linearly, and a spring is disposed between the stationary member and the spring support, whereby the spring is adapted to store compressive energy when the crankshaft is rotated through a predetermined angle by a driving source, and, through a further revolution of the crankshaft, the spring releases the stored energy to accelerate the revolution of the crankshaft.

4 Claims, 13 Drawing Figures

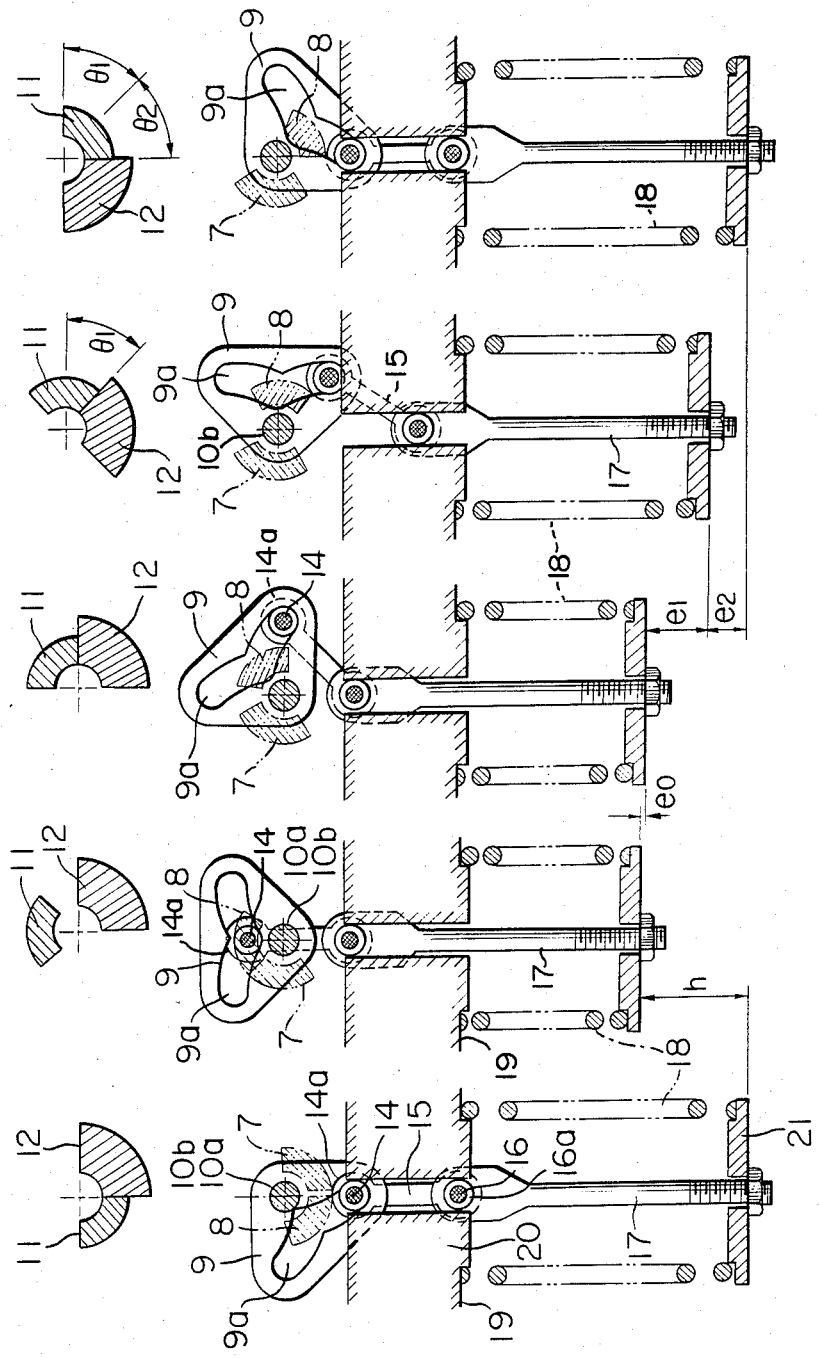

SPRING-OPERATED MECHANISM

BACKGROUND OF THE INVENTION

1. Field of the Invention

The present invention relates to a spring-operated mechanism and more particularly to a spring-operated mechanism for actuating a switch gear, etc. although not limited thereto.

2. Description of the Prior Art

As the voltage and capacity in electric transmission and substation systems have increased, the switch gears have also tended to become larger, requiring an operating apparatus having a large output to drive the switch gears. Hitherto, for operating apparatus having large output, fluid operating systems such as pneumatic or hydraulic operating systems have been most common and motor-driven spring-operated systems have also been utilized for relatively small outputs.

However, a fluid operating system is inferior to a motor-driven spring-operated system from the standpoint of maintenance. For example, the former has such practical problems as the maintenance, inspection, etc. of a compressor in a pneumatic system, or lubricant leakage at connections of the piping, etc. in a hydraulic system.

As a motor-driven spring-operated system, one using a toggle joint has been hitherto widely used. Examples of principal elements and the operational principle thereof are schematically indicated in FIGS. 1 and 2, respectively. Now the features of a conventional motor-driven spring-operated apparatus utilizing a toggle joint will be explained below in reference to FIGS. 1 and 2.

The operational principle is shown in FIGS. 2A-2D as follows:

(i) Upon receiving a demand for operation, a motor (not shown) begins to rotate, and the torque is transmitted to a motor lever 1 through a reduction gear (not shown);

(ii) As motor lever 1 comes into contact with one of projections 2a of a spring lever 2 as shown in FIG. 2A, a spring 5 now being at a point of maximum elongation is gradually compressed by the torque of motor lever 1 to store energy therein and reaches a point of maximum compression as shown in FIG. 2B, whereby spring 5 is disposed within a spring casing pivotally mounted to a stationary member through pivots 5a in parallel with an output shaft 4. Another projection 2b of spring lever 2 abuts against an output shaft lever 3 when spring 5 for the first time reaches the point of maximum compression;

(iii) After reaching the point of maximum compression, spring 5 begins to release the stored energy to accelerate output shaft lever 3 through spring lever 2; and (iv) When spring 5 again reaches the point of maximum elongation (in a position such that the inclination of spring 5 with respect to the vertical axis is just opposite that at the initiation of the operation.) the operation is completed as shown in FIG. 2C.

The reverse operation takes place similarly starting from the state shown in FIG. 2D by repeating the operations described above in the rearward direction.

Thus it will be appreciated that a spring-operated system of the toggle joint type has a simple operational principle, has few components, and thus exhibits superiority from the viewpoint of economy. In general, in switch gears, in particular in one provided with the ability to break an electric current, in order to obtain a sufficient initial separation speed, a large amount of energy is required at the initial phase of the operation. However, with a spring-operated system of the toggle joint type shown in FIGS. 1 and 2, since the released energy of spring 5 at the initial phase of the operation corresponding to the rotation of output shaft 4 for a predetermined angle is less than that during its operation, it is difficult to obtain a sufficient initial separation speed. In order to obviate such a difficulty it is conceivable that the maximum compressive load of the toggle joint spring can be set higher. However, in this case, it is necessary to absorb the excess energy accumulated in the moving parts of the switch gear at the time of the completion of the operation by the use of a damping means etc., and new problems occur such as increasing oscillations of the system at the completion of the operation due to impact force.

In order to remedy the difficulties inherent to the conventional spring-operated mechanisms as discussed above, Japanese Patent Publication No. 46609/1980 (filed on Aug. 15, 1975, claiming the priority of West German Patent Application No. P2439837.6 filed on Aug. 16, 1974, by Siemens A.G., entitled "A Snap Type Driving Apparatus for a Switch Gear", published on Nov. 25, 1980) discloses a mechanism wherein the parts participating in closing or opening the switch gear are disposed in a concentric manner so as to be rotatable, and further both of the parts are provided with concave portions so as to be engageable by an engaging pin connected to the energy storing spring.

Further, Japanese Laid-Open Patent Publication No. 15 9511/1980 (filed on May 31, 1979 by Tokyo Shibaura Denki Co., Ltd., entitled "A Motor Drive Spring-Operated Apparatus", laid-open on Dec. 11, 1980) discloses a mechanism wherein a crank pin connected to and driven by an electric motor is adapted to rotate a rotational shaft by a link engaging the crank pin through a slot and a lever pivoted to the link and connected to the shaft so that the torque of the electric motor causes a spring to store energy by means of the rotational shaft.

However, none of them teach or suggest the use of cam means in a spring-operated mechanism in order to make the spring release the major part of the stored energy at the initial phase of the operation of the mechanism as in the present invention.

SUMMARY OF THE INVENTION

An object of the present invention is to provide a spring-operated mechanism which does not have the defects of the conventional mechanism as discussed above.

Another object of the present invention is to provide a spring-operated mechanism which is applicable to operate a switch gear or similar device that requires large operational force at the initial phase of the operation.

A further object of the present invention is to provide a spring-operated mechanism which can make the initial separation speed higher than in the conventional mechanism when it is used in association with a switch gear.

In accordance with the present invention a spring-operated mechanism is provided which comprises a cam secured to a crankshaft and adapted to be moved thereby, cam grooves formed therein, a rod provided with a pin at one end adapted to be rolled within the cam grooves and at the other end a spring support, a stationary member provided with means to guide the rod along a rectilinear course, and a spring disposed between the stationary member and the spring support, whereby the spring is adapted to store energy when the crankshaft is rotated through a predetermined angle by a driving source, and, upon further revolution of the crankshaft beyond the predetermined angle, the spring releases the stored energy to cause the crankshaft to be rotated quickly.

BRIEF DESCRIPTION OF THE DRAWINGS

Other objects and advantages of this invention will become apparent from the following description considered along with the accompanying drawings wherein are set forth by way of illustration and example certain embodiments of this invention, in which:

FIGS. 4A to 4E are representations of the sequential states of the main components of the mechanism shown in FIG. 3 to illustrate its operational principle;

DESCRIPTION OF THE PREFERRED EMBODIMENTS

Figure 1:
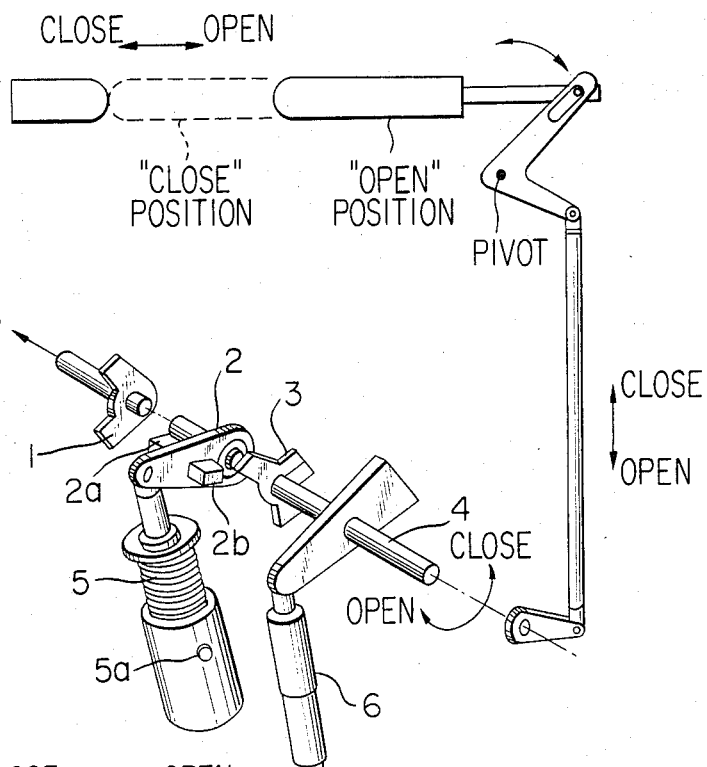
FIG. 1 is a schematic exploded representation of a conventional motor-driven spring-operated mechanism as used for operating a switch gear.
Figure 3:
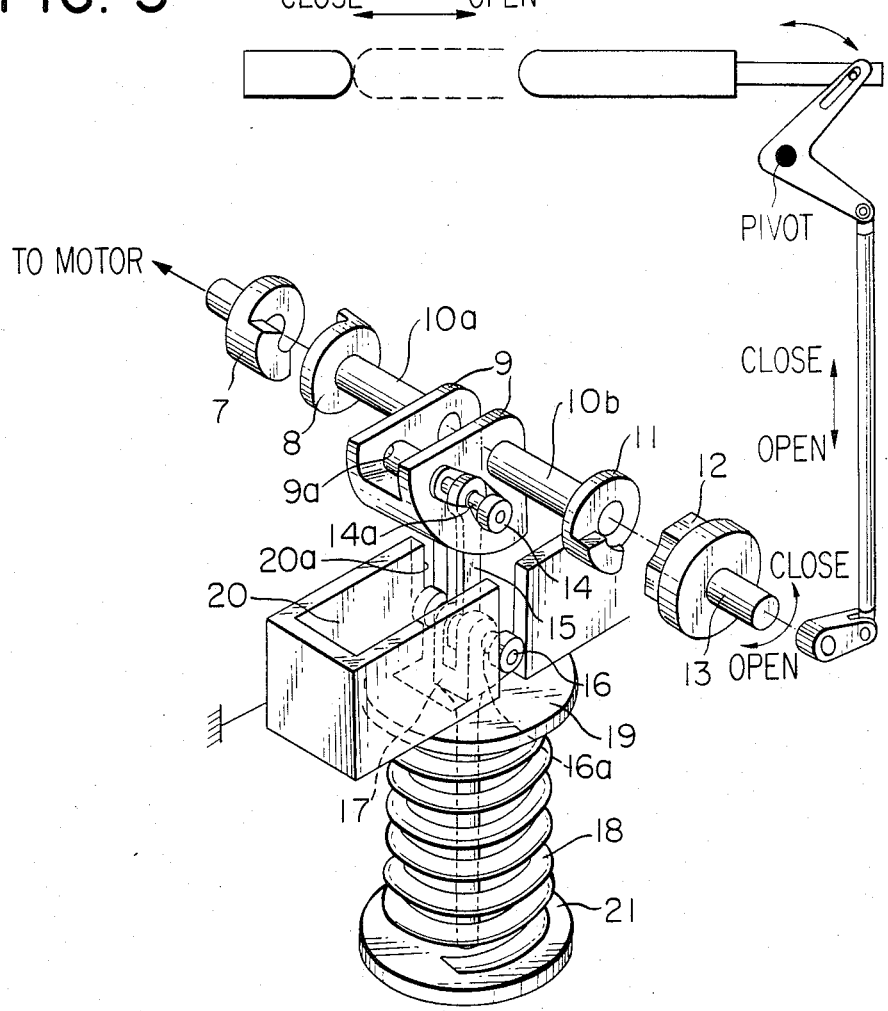
FIG. 3 is a schematic exploded representation of one embodiment of the present invention as used for actuating a switch gear.
Figure 2A:
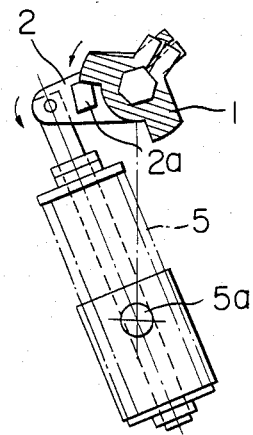
FIGS. 2A to 2D are representations of the sequential states of the main components of the mechanism shown in FIG. 1 to illustrate its operational principle.
Figure 2B:
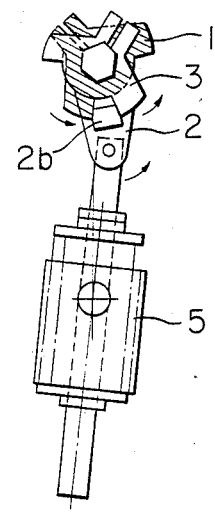
Figure 2C:
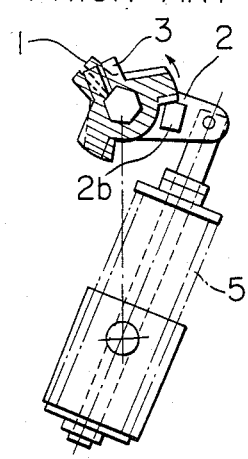
Figure 2D:
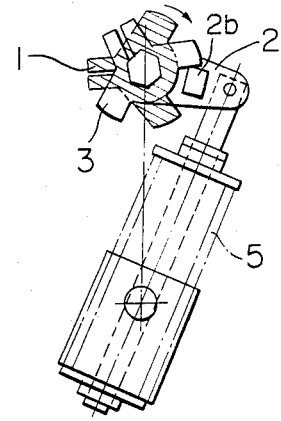

Referring now to FIG. 3 wherein an embodiment of the present invention is schematically shown, it should be noted that in order to facilitate the understanding of the present invention, levers, etc. which are originally in contact with each other are shown separated from each other, and the casing for the mechanism, an electric motor, a reduction gear box, bearings, etc. are all omitted.

In FIG. 3, the reference numeral 7 denotes a motor lever to transmit motor torque given thereto from an electric motor through a reduction gear, motor lever 7 being adapted to abut against a spring lever 8 while the former rotates through a predetermined rotational angle from the initial point. Therefore, the rotational axes of motor lever 7 and spring lever 8 are disposed in a line. Spring lever 8 and a cam lever 11 are rigidly connected on a line through a crank mechanism comprising crankshafts 10a, 10b and a pair of separated confronting crank arms 9, each having a sector form with the peripheral portions thereof being connected together and rigidly connected at their outer portions to confronting ends of the crankshafts 10a, 10b. The other ends of the crankshafts 10a, 10b are rigidly connected to spring lever 8 and cam lever 11, respectively. In this embodiment, each of crank arms 9 has a sector form with its center of rotation coinciding with the centers of crankshafts 10a and the two crank arms 9 are adapted to act together as a cam member. For this purpose each of them is formed with a cam groove 9a therein so that the grooves 9a are aligned with each other with a gap being left therebetween, cam groove 9a having generally a heart shape with its longitudinal center line lying on the bisector of the sector and with the "point" of the "heart" facing towards the axes of crankshafts 10a, 10b.

In other words, cam groove 9a has such a shape that the distance from the center of the crankshaft 10a, 10b is smallest at the middle portion of the groove 9a and progressively increases towards the extremities of the groove 9a. A rod-like cam follower 14a provided at each end with a guide roller 14 is disposed within the gap between crank arms 9 so that guide rollers 14 are rotatively guided with cam grooves 9a.

One end of a connecting rod 15 is rotatably connected to cam follower 14a, and the other end of connecting rod 15 is rotatably connected to a spring rod 17. For this purpose, both ends of connecting rod 15 are pivotally connected to cam follower 14a, and a pin 16a, respectively, pin 16a pivotally connecting one of the ends of connecting rod 15 and spring rod 17. Pin 16a carries at each end a roller 16. A stationary roller guide 20 comprising a pair of confronting parallel transverse plates and secured to the casing of the mechanism is provided with vertical grooves 20a in both confronting plates so as to guide rollers 16 of pin 16a to move rectilinearly.

A spring support 19, carrying one end of a spring 18, is fixedly secured to roller guide 20. Another spring support 21, carrying the other end of spring 18, is fixedly secured to the free end of spring rod 17. An output shaft lever 12 lying coaxially to cam lever 11 is adapted to transmit the torque of cam lever 11 due to the release of the stored energy of spring 18 to be described later.

The operation of the motor-driven spring-operated mechanism described above and illustrated in FIG. 3 will be explained with reference to FIGS. 4A to 4E which schematically represent the sequential states of the main components of the mechanism shown in FIG. 3 to illustrate its operational principle. In FIGS. 3 and 4 the same reference numerals denote similar or corresponding members.

(a) Upon receiving an operation command, the motor (not shown) begins to rotate motor lever 7 from the state shown in FIG. 4A, the motor torque being transmitted to motor lever 7 through the reduction gear (not shown), and motor lever 7 causes spring lever 8 abutting thereto to be rotated;

(b) Since the cam or crank arms 9 and cam lever 11 are connected to spring lever 8 through crankshafts 10a and 10b, they are caused to rotate as spring lever 8 rotates. At this time, cam follower 14a shifts upwards as viewed in FIG. 4B with guide rollers 14 being guided along cam grooves 9a as crank arms 9 rotate so that spring 18 is compressed between spring supports 19 and 21 through connecting rod 15 and spring rod 17. Thus, spring 18 reaches height h as shown in FIG. 4B;

(c) Motor lever 7 is adapted to stop its rotation after it carries out a small rotation after spring 18 has reached a state of maximum compression. This small rotation causes a small elongation (e·) of spring 18. At this time, since the cam or crank arms 9 have passed their top dead centers, they continue to rotate further due to the release of the energy stored in spring 18, cam follower 14a being simultaneously urged to the position shown in FIG. 4C. In this case, the released energy of spring 18 is a small value corresponding to the stroke e· of spring 18 as shown in FIG. 4C. Therefore, the impact due to the collision of guide rollers 14 of cam follower 14a with the bottoms of cam grooves 9a is very small. At this stage, cam lever 11 for the first time comes into contact with output shaft lever 12 as shown in FIG. 4C;

(d) The cam or crank arms 9 are accelerated and quickly moved through spring rod 17 and connecting rod 15 due to the release of the energy stored in spring 18 as shown in FIG. 4D. Simultaneously output shaft lever 12 and output shaft 13 (FIG. 3) are quickly moved as cam lever 11 connected to crankshaft 10b through crank arms 9 rotates, output shaft lever 12 being rotated through an angle $\theta_1$ as shown in FIG. 4D;

(e) Spring 18 continues to release the accumulated energy until it reaches a state of maximum elongation as shown in FIG. 4E. At this stage of the operation the cam or crank arms 9 occupy a position in symmetry with that at the time of the start of the operation shown in FIG. 4A, output shaft lever 12 rotating further through angle $\theta_2$ as shown in FIG. 4E;

(f) By reversing the rotation of the motor to reversely rotate motor lever 7, a reverse operation can be carried out in a manner similar to the procedures (a) to (e) described above.

As will be understood, with the motor-driven spring-operated mechanism in accordance with the present invention, as shown in FIGS. 4A to 4E, since the stroke $e_1$ of spring 18 corresponding to the rotational angle $\theta_1$ of output shaft lever 12 during the first half of the operation is larger than the spring stroke $e_2$ corresponding to the rotational angle $\theta_2$ of output shaft lever 12 during the last half of the operation, it is advantageous in quickening the initial separation velocity in a switch gear. Further, at the time of the completion of the operation, since the energy to be stored in the moving parts of the switch gear is less than that of a conventional switch gear, there arises another advantage that no dampers, etc. need be utilized to absorb excessive energy.

Figure 5:
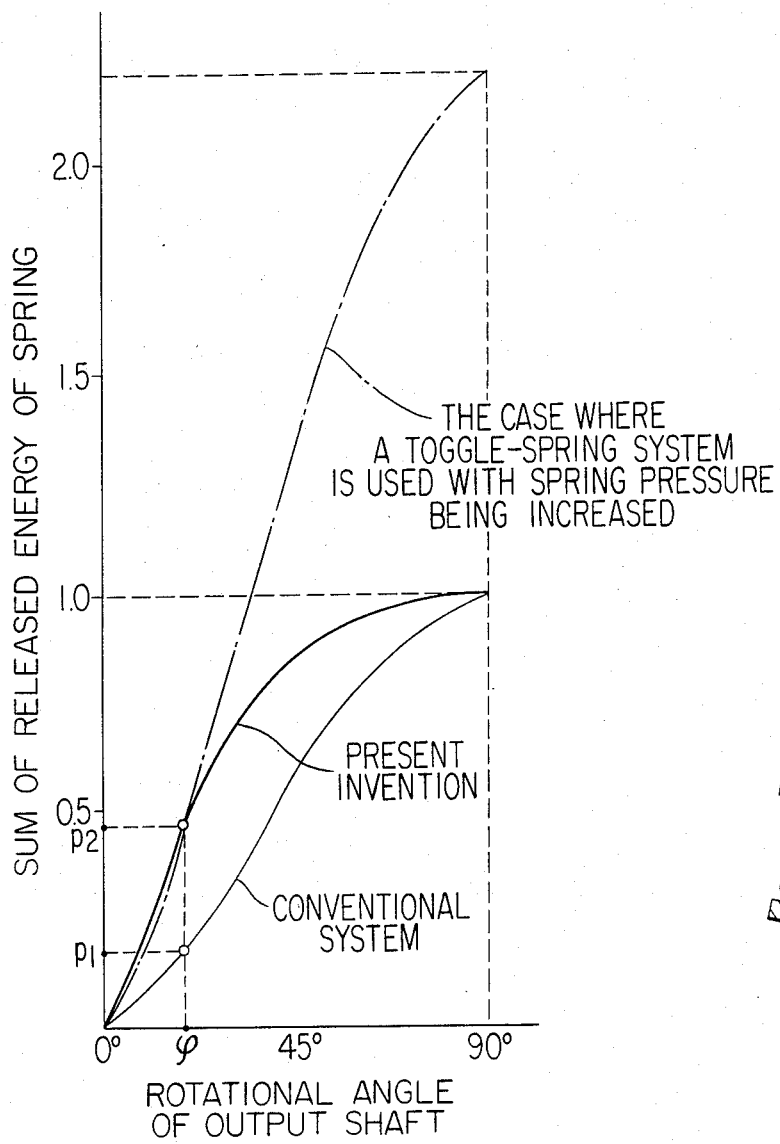
FIG. 5 illustrates characteristic curves of the conventional mechanism shown in FIGS. 1 and of 2 and the mechanism in accordance with the present invention shown in FIGS. 3 and 4.

FIG. 5 graphically represents the above advantages of the present invention over a conventional system. The sum of the energy released by the spring is plotted against the angle of rotation of the output shaft for an angle of rotation of up to 90°. In FIG. 5, the angle $\phi$ represents the rotational angle of the output shaft necessary for obtaining a predetermined initial separation velocity, and $P_2$ represents the energy necessary for obtaining the same. $P_1$ represents the energy to be given to the output shaft during the rotation through the angle $\phi$ in a conventional spring-operated mechanism of the toggle joint type (assuming that the spring force is adjusted to correspond to the case of the present invention).

As will be apparent from FIG. 5, in a motor-driven spring-operated mechanism in accordance with the present invention, the released energy of the spring is larger at the initial phase of the rotation of the output shaft, rapidly decreasing as the rotation of the output shaft progresses. Contrarily, in a conventional motor-driven spring-operated mechanism of the toggle joint type, the released energy of the spring is high midway through the rotation of the output shaft. Therefore, if the sum of the discharged energy of the spring is assumed to be constant, the initial separation velocity in a conventional mechanism is lower than that in the mechanism in accordance with the present invention.

Further, in a conventional mechanism, as shown by the dot-and-dash line in FIG. 5, if it is attempted to achieve the predetermined separation velocity by increasing the spring pressure, excessive energy must be accumulated in the moving parts of the mechanism, causing problems such as oscillation at the time of the completion of the operation.

From the foregoing, as will be apparent, with the motor-driven spring-operated mechanism in accordance with the present invention, a very large operational force compared with that of the conventional mechanism of the toggle joint type (more than roughly two times the force in the conventional mechanism) can be obtained by the use of spring pressure substantially identical to that of the conventional system. The present invention also has the advantage of suppressing to a low level the oscillation, etc. at the time of the completion of the operation.

Therefore, if the mechanism according to the present invention is utilized for the purpose of obtaining an operation force similar to that obtainable in a conventional mechanism, it is possible to have the spring pressure much lower than that in a conventional mechanism, remarkably decreasing oscillations, etc. at the time of the completion of the operation.

Figure 6:
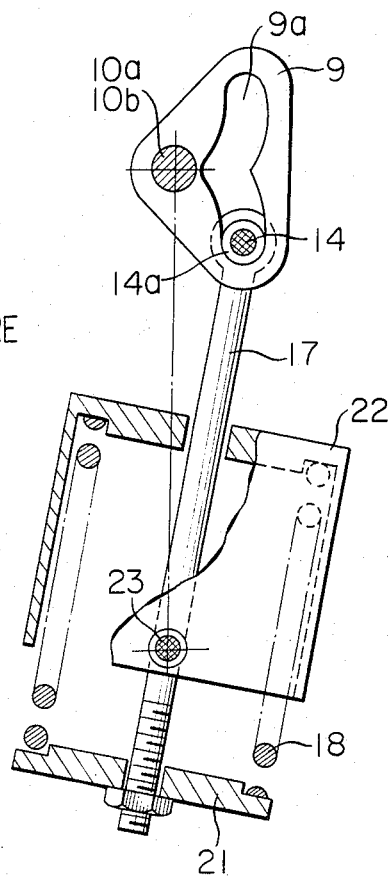
FIG. 6 is a view of another embodiment of the present invention, with the inside of the spring casing partially exposed.

In the embodiment shown in FIG. 3, for the purpose of removing the energy loss due to the oscillations of the spring, rollers 16 mounted to pin 16a pivotally connecting spring rod 17 to connecting rod 15 are constrained by roller guides 20 so that the movement of spring 18 is made linear. However, in a modified embodiment of the present invention, as shown in FIG. 6, spring rod 17 and cam follower 14a may be directly connected without intervening connecting rod 15. It will be appreciated that this modified embodiment can reveal the effects similar to those in the first embodiment. In FIG. 6 the reference numeral 22 shows a spring casing and the reference numeral 23 shows pivots which pivotally mount spring casing 22 to the housing of the mechanism, crankshafts 10a, 10b being maintained always in a prescribed positional relationship as in the first embodiment.

While there are described and illustrated herein a few preferred embodiments of the present invention it will be understood that modifications may be made without departing from the spirit of the present invention.

What is claimed is:

1. A spring-operated mechanism comprising:
   a cam means secured to a crankshaft and adapted to be moved thereby,
   cam grooves formed in said cam means having such a shape that the distance from a center of said crankshaft is smallest at a middle portion of said cam grooves and progressively increases towards extremities of said cam grooves,
   a connecting rod provided with a guide roller at one end rolling within said cam grooves,
   a spring rod provided at the other end of the connecting rod,
   a bottom spring support connected to the spring rod at an end opposite from the connecting rod,
   a stationary member provided with groove means at the other end of the connecting rod for guiding rectilinear movement of said connecting rod, and
   a spring support means disposed between said stationary member and said bottom spring support,
   whereby said spring means is adapted to accumulate energy when said crankshaft is rotated through a predetermined angle by a driving source, and, upon further revolution of said crankshaft, said spring means releases said energy to urge said crankshaft to rotate quickly.

2. A spring-operated mechanism as claimed in claim 1 wherein:

said spring rod is pivotally connected to said connecting rod by a connecting pin.

3. A spring-operated mechanism as claimed in claim 2 wherein said connecting pin is provided with at each end a roller which is adapted to be moved rectilinearly along said groove means upon rotation of said crankshaft.

4. A spring-operated mechanism comprising:

a cam means secured to a crankshaft and adapted to be moved thereby, cam grooves formed in the cam means having such a shape that the distance from a center of the crankshaft is smallest at a middle portion of the cam grooves and progressively increases towards extremities of the cam grooves, a spring rod provided with a guide roller at one end rolling within the cam grooves and provided at the other end with a spring support, a spring case provided with an opening to allow rectilinear movement of the spring rod therethrough, and a spring means contained inside the spring case above the spring support, whereby the spring means is adapted to accumulate energy when the crankshaft is rotated through a predetermined angle by a driving source, and, upon further revolution of the crankshaft, said spring means releases the energy to urge the crankshaft to rotate quickly.

* * * * *